(12) United States Patent
Gluck et al.

(10) Patent No.: US 11,608,744 B2
(45) Date of Patent: Mar. 21, 2023

(54) SYSTEM AND METHOD FOR AIR INJECTION PASSAGEWAY INTEGRATION AND OPTIMIZATION IN TURBOMACHINERY

(71) Applicant: HONEYWELL INTERNATIONAL INC., Morris Plains, NJ (US)

(72) Inventors: Jeffrey Gluck, Tempe, AZ (US); Bruce Reynolds, Chandler, AZ (US); John Repp, Gilbert, AZ (US)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 10 days.

(21) Appl. No.: 16/927,161

(22) Filed: Jul. 13, 2020

(65) Prior Publication Data
US 2022/0010682 A1 Jan. 13, 2022

(51) Int. Cl.
*F01D 5/14* (2006.01)
*F01D 9/04* (2006.01)
*B33Y 80/00* (2015.01)

(52) U.S. Cl.
CPC ............. *F01D 5/145* (2013.01); *F01D 9/041* (2013.01); *B33Y 80/00* (2014.12); *F05D 2240/121* (2013.01); *F05D 2240/122* (2013.01)

(58) Field of Classification Search
CPC ... F01D 5/12; F01D 5/14; F01D 5/141; F01D 5/145; F01D 5/147; F01D 5/18;
(Continued)

(56) References Cited

U.S. PATENT DOCUMENTS

| 4,146,352 A | 3/1979 | Yasugahira et al. |
| 6,435,815 B2 | 8/2002 | Harvey et al. |

(Continued)

FOREIGN PATENT DOCUMENTS

| CN | 107023400 A | 8/2017 |
| CN | 111577657 A | 8/2020 |

(Continued)

OTHER PUBLICATIONS

Culley, Dennis, et al., "Active Flow Separation Control of a Stator Vane Using Surface Injection in a Multistage Compressor Experiment," Proceedings of ASME Turbo Expo, Power for Land, Sea, and Sir, Jun. 16-19, 2003, downloaded from: http://proceedings.asmedigitalcollection.asme.org/ on Feb. 3, 2016 Terms of Use: http://www.asme.org/about-asme/terms-of-use.

*Primary Examiner* — Woody A Lee, Jr.
*Assistant Examiner* — Elton K Wong
(74) *Attorney, Agent, or Firm* — Lorenz & Kopf, LLP

(57) ABSTRACT

Systems and methods for air injection passageway integration and optimization in turbomachinery using surface vortex generation. An airfoil including a leading edge, a trailing edge, a pressure side, and a suction side, and is configured to influence an airflow as it passes from the leading edge to the trailing edge. The airfoil defines an aerodynamic passageway having an inlet on the pressure side and an outlet on the suction side to deliver air from the airflow through the airfoil to the suction side. The outlets are configured to inject the air at areas on either airfoil side targeted due to their propensity to generate undesirable boundary layer growth and associated flow losses. Outlet may also be included in the hub and the shroud of the turbomachine.

20 Claims, 7 Drawing Sheets

(58) Field of Classification Search
CPC ... F01D 9/02; F01D 9/04; F01D 9/041; F04D 29/68; F04D 29/681; B33Y 80/00; F05D 2240/121; F05D 2240/122; F05D 2270/17
USPC .......................................................... 416/91
See application file for complete search history.

(56) References Cited

U.S. PATENT DOCUMENTS

| | | | |
|---|---|---|---|
| 8,070,422 B1* | 12/2011 | Liang | F01D 5/145 |
| | | | 415/115 |
| 9,334,878 B2 | 5/2016 | Domercq et al. | |
| 10,107,104 B2* | 10/2018 | Bloxham | F01D 9/041 |
| 10,359,054 B2 | 7/2019 | Hiernaux | |
| 10,519,976 B2 | 12/2019 | Shimo | |
| 2005/0081530 A1* | 4/2005 | Bagnall | F04D 29/682 |
| | | | 60/785 |
| 2010/0266385 A1* | 10/2010 | Praisner | F04D 29/684 |
| | | | 415/115 |
| 2012/0009065 A1 | 1/2012 | Harvey et al. | |
| 2014/0165398 A1* | 6/2014 | Giovannetti | F01D 5/3061 |
| | | | 29/889.71 |
| 2014/0271158 A1* | 9/2014 | Li | F01D 5/143 |
| | | | 415/193 |
| 2015/0030439 A1 | 1/2015 | Pesteil et al. | |
| 2016/0052621 A1* | 2/2016 | Ireland | F04D 29/684 |
| | | | 137/13 |
| 2020/0270996 A1* | 8/2020 | Yamashita | F01D 5/145 |

FOREIGN PATENT DOCUMENTS

| | | |
|---|---|---|
| DE | 3505823 A1 | 8/1986 |
| JP | S61187502 A | 8/1986 |
| WO | 2005040559 A1 | 5/2005 |

* cited by examiner

SYSTEM AND METHOD FOR AIR INJECTION PASSAGEWAY INTEGRATION AND OPTIMIZATION IN TURBOMACHINERY

TECHNICAL FIELD

The present invention generally relates to flow optimization in turbomachinery, and more particularly relates to integrated and optimized air injection with surface vortex generation for performance improvement.

BACKGROUND

In turbomachines such as a gas turbine engine, a number of annular airfoil rows are disposed, usually in pairs one rotating attached to a shaft and one stationary attached to a stationary casing. The pair of rotating and stationary annular airfoil rows is referred to as a stage with a rotor and a stator. The rotating rotor airfoils, also known as blades, accelerate the fluid flow. The annular row of stationary stator airfoils, also known as vanes, may be fixed within the casing. The stator airfoils convert the increased rotational kinetic energy into increased static pressure by diffusion and redirect the flow direction of the fluid preparing it for downstream rotor airfoils or directing the flow into a downstream duct. Stator airfoils may be used in compressors, fans and in some turbines of turbomachinery such as in aircraft gas turbine engine applications.

To achieve turbine engine performance improvements, stage counts may be increased or fan and compressor aerodynamic loadings may be increased by velocity reduction with associated increased static pressure. This increase may reduce compressor efficiency potential when applying conventional engine design technology. A reduced efficiency potential impacts performance such as by increasing specific fuel consumption and increasing turbine operating temperatures in both steady state and transient engine operation. Increasing aerodynamic loadings and the accompanying reduced efficiency potential are challenging to offset without undesirably increasing pressure losses and without increasing flow deviation.

Accordingly, it is desirable to provide improved turbomachinery performance by offsetting reductions in efficiency potential by reducing pressure losses and flow deviation increases. Furthermore, other desirable features and characteristics of turbomachinery performance improvement will become apparent from the subsequent detailed description and the appended claims, taken in conjunction with the accompanying drawings and the preceding background.

BRIEF SUMMARY

This summary is provided to describe select concepts in a simplified form that are further described in the Detailed Description. This summary is not intended to identify key or essential features of the claimed subject matter, nor is it intended to be used as an aid in determining the scope of the claimed subject matter.

Systems and methods are provided for optimized, integrated air injection in turbomachinery. In a number of embodiments, a turbomachine includes an airfoil with a leading edge, a trailing edge, a pressure side, and a suction side, and is configured to influence an airflow passing from the leading edge to the trailing edge. The airfoil defines an aerodynamic passageway having an inlet and one or more outlets to deliver air through the airfoil to a target area. The outlets are configured to inject the air at targeted areas that have a propensity to generate substantial flow losses. In some embodiments, outlets may also be included in the hub and the shroud of the turbomachine.

In a number of additional embodiments, a method of manufacturing a turbomachine includes forming an airfoil with a leading edge, a trailing edge, a pressure side, and a suction side so that the airfoil is configured to influence an airflow as it passes from the leading edge to the trailing edge. An aerodynamic passageway is defined in the airfoil to have an inlet on the pressure side and/or on the suction side. The aerodynamic passageway is configured to deliver air from the airflow through the airfoil to a target region of the suction side and/or of the pressure side. The target regions of the suction/pressure side are identified that have a propensity to generate substantial flow losses. The outlet or multiple outlets are located to inject the air at the identified areas of the respective side. The airfoil may be constructed using an additive manufacturing process. In a number of embodiments, the passageway includes an enlarged cavity in the airfoil that serves as a reservoir of air for injection.

In a number of other embodiments, a turbomachine system includes a shroud and a hub configured to contain an airflow. A plurality of airfoils are disposed between the shroud and the hub, and each airfoil includes a leading edge, a trailing edge, a pressure side, and a suction side. The shroud, the hub, and the airfoils define a number of airflow channels in the turbomachine. Each airfoil is configured to influence the airflow as it passes through one of the airflow channels from the leading edge to the trailing edge. The airfoil, the hub and the shroud together define a number of internal aerodynamic passageways, each aerodynamic passageway having an inlet, an enlarged cavity, and an outlet. The internal aerodynamic passageways are configured to deliver air from the airflow through the airfoil, the hub and the shroud to outlets. The outlets are configured to inject the air at areas of the airflow channels targeted due to their propensity to generate substantial flow losses in the airflow channels.

BRIEF DESCRIPTION OF THE DRAWINGS

The present invention will hereinafter be described in conjunction with the following drawing figures, wherein like numerals denote like elements, and wherein.

DETAILED DESCRIPTION

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary, or the following detailed description.

Various embodiments disclosed herein are directed to specifically designed integrated passageways and their locations that optimize airflow as it is influenced by an airfoil. In a number of embodiments, the airfoil is a stator airfoil of a gas turbine engine that is designed to diffuse and turn the airflow to an optimal angle directed at a rotor. Via the integrated passageways, air is injected at specific identified locations where flow losses would otherwise be significant, such as would be caused by secondary flows or flow separations if not corrected. A layer of fluid near the surface of the airfoil called the boundary layer is characterized by velocity changes from zero at the surface to the free stream speed value away from the surface. The boundary layer is thin where there is a favorable pressure gradient, and develops or thickens where there is an adverse pressure gradient. Flow separation, secondary flows and larger wakes may develop that reduce performance counter to the intended function of the airfoil. It has been found that providing passageways as disclosed herein to collect flow from high quality (low boundary layer) collection site areas and then inject the flow at locations where boundary layer development is occurring, improves performance such as by minimizing boundary layer thickness, minimizing wakes, and reducing deviation from intended airfoil flow redirection. In a number of embodiments, the number of collection sites may differ from the number of injection sites and an internal cavity may be included to provide a reservoir of air carried within the airfoil. In a number of embodiments, the healthy air is redirected from the airfoil's pressure side to targeted areas of its suction side. In other embodiments, air from the suction side is redirected to control/mitigate the boundary layer on the pressure surface. In additional embodiments, air is redirected from one side of the airfoil to reduce losses on the same side. In some embodiments, air is also supplied through the shroud and/or the hub to targeted areas. Additive manufacturing processes may be used as an enabler of forming the integrated passageways.

Figure 1:
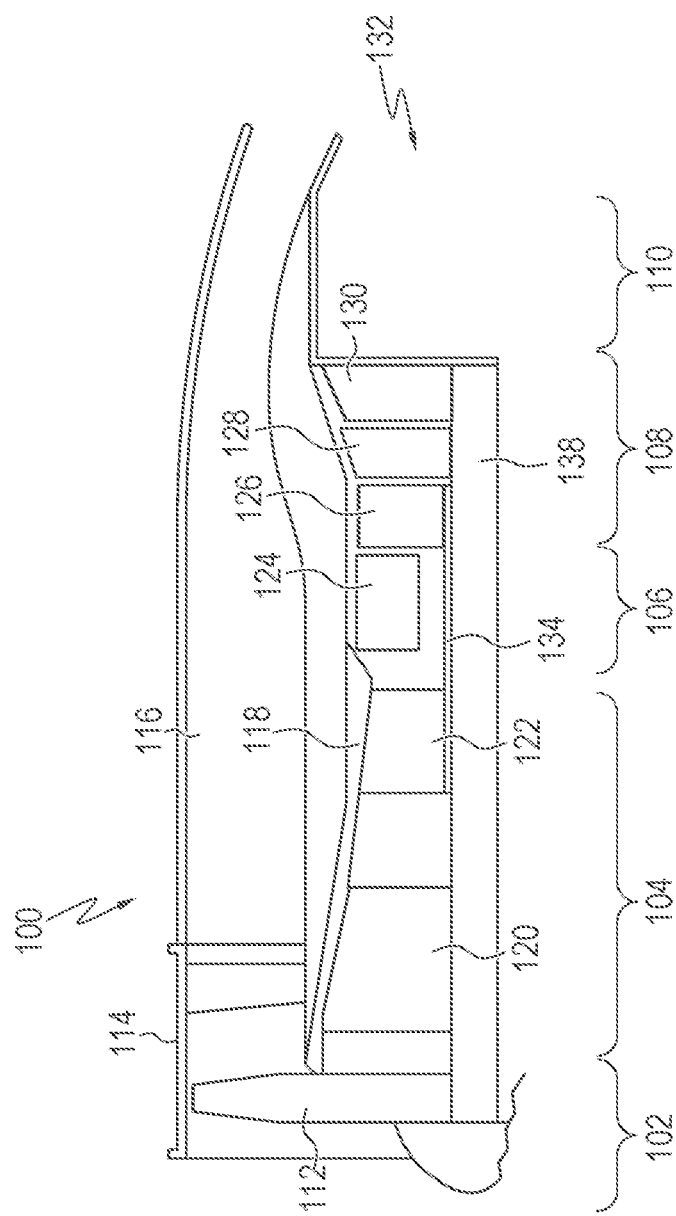
FIG. 1 is a schematic, fragmentary, sectional illustration of a gas turbine engine, according to an exemplary embodiment.

Referring to FIG. 1, a cross-sectional view of an exemplary turbofan gas turbine engine 100 is illustrated. In general, the turbofan gas turbine engine 100 includes a fan section 102, a compressor section 104, a combustion section 106, a turbine section 108, and an exhaust section 110. The fan section includes a fan 112 mounted on the low-pressure turbine shaft 138 and contained within a fan casing 114. The fan 112 induces air from the surrounding environment into the engine and passes a fraction of this air toward the compressor section 104. The compressor section 104 includes at least one compressor and, in the depicted embodiment, includes a low-pressure compressor 120 and a high-pressure compressor 122. The low-pressure compressor 120 raises the pressure of the air directed into it from the fan 112 and directs the compressed air into the high-pressure compressor 122. The compressors are mounted on turbine shafts 134 and 138 and contained within a compressor casing or shroud 118.

The combustion section 106 of gas turbine engine 100 includes a combustor 124 in which the high-pressure air from the high-pressure compressor 122 is mixed with fuel and combusted to generate a combustion gas. The combustion gas is then directed into the turbine section 108. The turbine section 108 includes a number of turbines disposed in axial flow series. The combustion gas from the combustion section 106 expands first through the high-pressure turbine 126, passes through the inter-turbine duct 128, and expands again through the low-pressure turbine 130, causing the turbine rotors to rotate at different speeds. As the turbines 126 and 130 rotate, each respectively drives equipment in the gas turbine engine 100 via concentrically disposed shafts or spools 134 and 138. The combustion mixture is then exhausted through the exhaust section 110.

Figure 2:
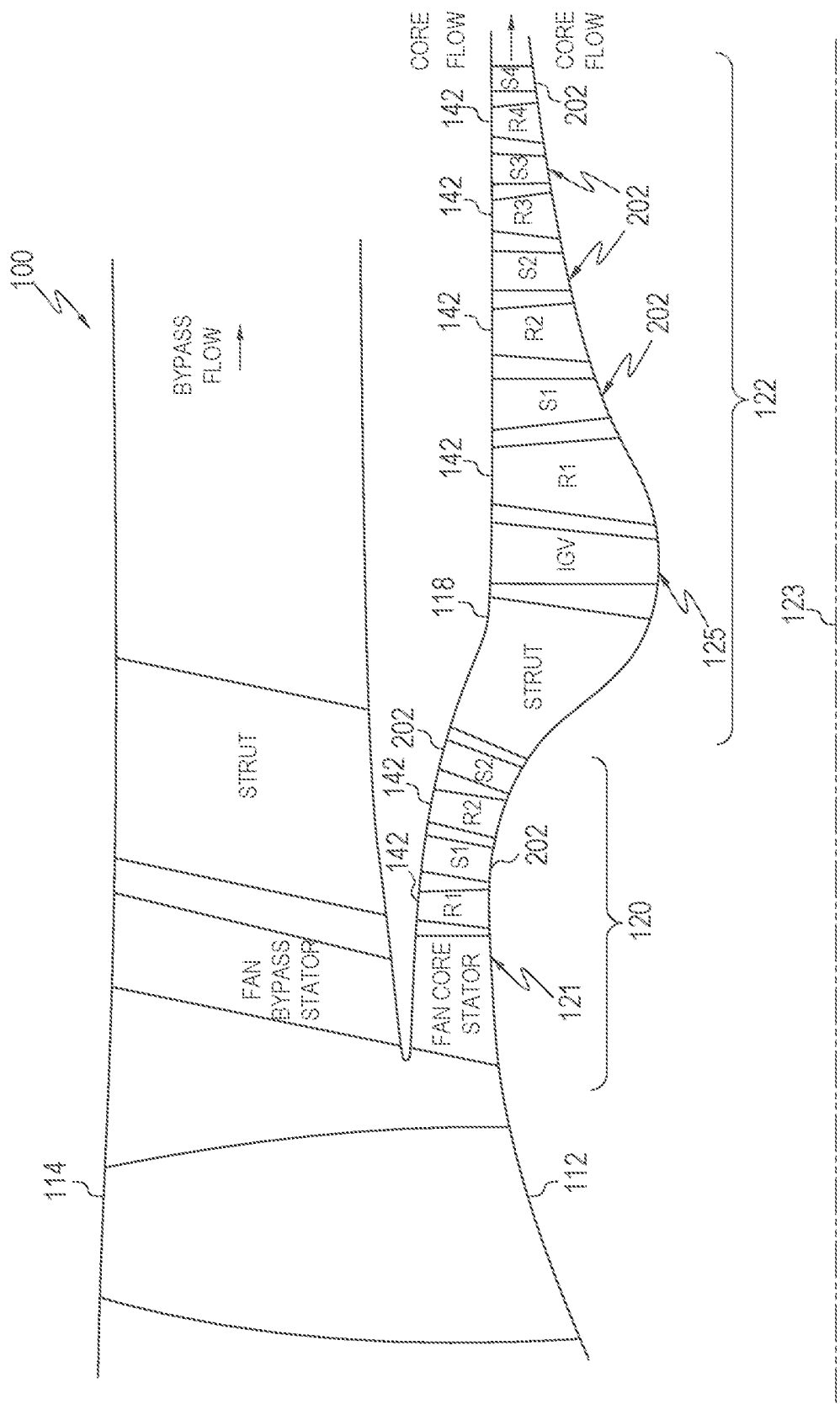
FIG. 2 is a schematic, sectional view through a portion of the fan and compressor of the gas turbine engine of FIG. 1, according to an exemplary embodiment.

FIG. 2 is a schematic sectional view through a portion of the engine 100 including the fan 112, the low-pressure compressor 120, and the high-pressure compressor 122. The compressors 120 and 122 each include one or more compressor stages spaced in a circumferential direction around the longitudinal centerline axis 123. Each compressor stage has a compressor rotor 142 (e.g., rotors R1 and R2 in the low-pressure compressor 120 and rotors R1, R2, R3, and R4 in the high-pressure compressor 122). Cooperating with each compressor rotor 142 is a corresponding stator airfoil 202. The low-pressure compressor 120 depicted in FIG. 2 has two compressor stages, stage 1 and stage 2. The low-pressure compressor stage 1 includes rotor R1/142 and corresponding stator airfoils (fan core stator) 121 and S1/202. These stators 202 may be variable or fixed. The low-pressure compressor stage 2 includes rotor R2/142 and corresponding stator airfoil S2/202. The high-pressure compressor stage 1 depicted in FIG. 2 includes IGV (inlet guide vane) 125, rotor R1/142, and corresponding stator airfoil S1/202, high-pressure compressor stage 2 includes rotor R2/142 and corresponding stator airfoil S2/202, high-pressure compressor stage 3 includes rotor R3/142 and corresponding stator airfoil S3/202, and high pressure compressor stage 4 includes rotor R4/142 and corresponding stator airfoil S4/202. While FIG. 2 depicts a fan 112 with a single fan stage, a low-pressure compressor 120 with two compressor stages and a high-pressure compressor 122 with four compressor stages, it is to be understood that the number of fan stages and compressor stages may vary from that depicted, with a greater number of fan stages, and fewer or greater compressor stages. Although the exemplary embodiments of the stator airfoils are disclosed herein for a low-pressure compressor and a high-pressure compressor, the stator airfoils according to exemplary embodiments may be used in other compressors and in other applications such as fan and turbine sections or in applications other than gas turbine engines.

The various stator airfoils are designed to diffuse and turn the airflow to provide the correct velocity and angle of the air flowing to the rotor blades. The delta in inlet air angle and inlet blade angle at a specific height or span of the blade is the blade incidence which in wing theory is synonymous with angle of attack. Less than optimal turning may occur where flow separation from the airfoils results in turning deviation where there is a departure from the designed turning as the air separates from the airfoil surface. Where there is deviation, the air flowing to the rotor airfoils does not approach at the optimal blade incidence angle. A layer of air near the surface of the airfoils called the boundary layer is characterized by a change in velocity from zero at the surface to the free stream value away from the surface. The airflow reacts to the edge of the boundary layer similar to the way it reacts to the physical surface of the airfoil. As a result, the boundary layer gives the airfoil an "effective" shape which is usually slightly different from the physical shape. Where the boundary layer separates from the airfoil an effective shape may be created that is much different from the physical shape. Reducing the stator airfoil boundary layer growth reduces pressure losses and flow deviation. As disclosed herein, the generation of airfoil surface micro-vortex flow structures energizes the boundary layer for reduced stator pressure loss and decrease flow deviation. This is achieved by incorporating passageways and/or cavities within the airfoil, which inject air onto an airfoil targeted surface to generate surface vortices, as an integral feature of an additive manufactured design. Advantageously, boundary layer growth is reduced by what amounts to passive means that inject strong healthy air at specifically targeted areas to maximize performance improvements.

Figure 3:
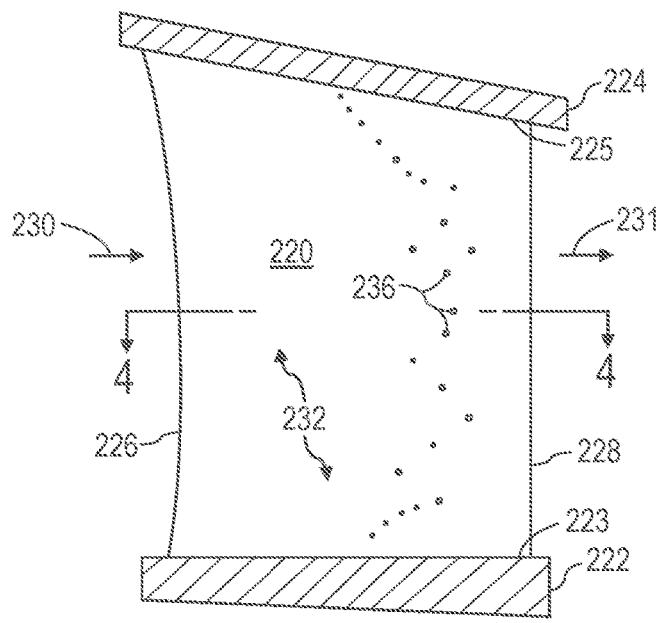
FIG. 3 is a fragmentary sectional view of a stator airfoil area of the gas turbine engine of FIG. 1, according to an exemplary embodiment.
Figure 4:
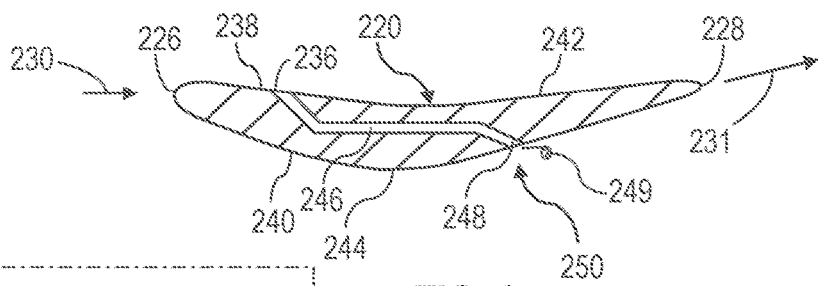
FIG. 4 is a cross sectional illustration taken generally through the line indicated at 4-4 in FIG. 3, according to an exemplary embodiment.
Figure 5:
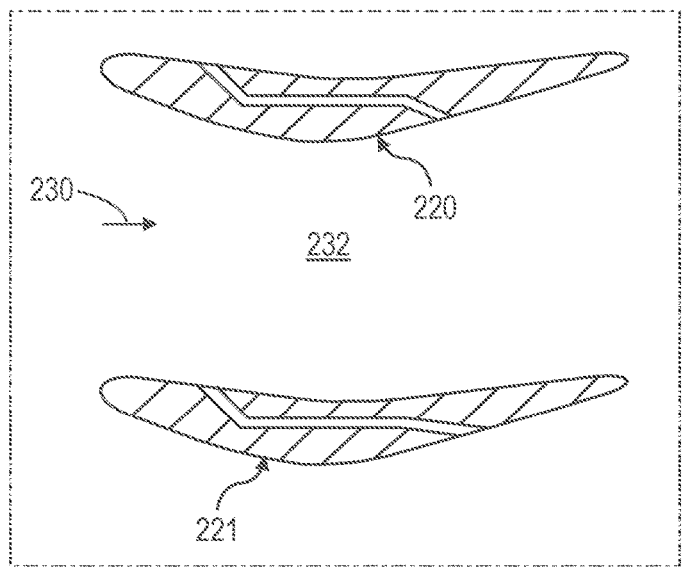
FIG. 5 is a cross section of the stator airfoil area of FIG. 3 showing two airfoils, according to an exemplary embodiment.

Referring to FIG. 3, a representative airfoil 220 usable as any of the airfoils of FIG. 2, extends between a hub case 222 and a shroud case 224. The hub line or wall 223 is defined where the airfoil 220 intersects the hub flow path (air following the hub case 222), and the shroud line or wall 225 is defined where the airfoil 220 intersects the shroud flow path (air following the shroud case 224). The airfoil 220 includes a leading edge 226 and a trailing edge 228. The airfoil 220 is designed to take incoming airflow 230 and turn it from the leading edge 226 so that it leaves at the trailing edge 228 in the direction of the airflow 231 as shown in FIG. 4. An airfoil 220 to airfoil 221 flow channel or passage 232 is defined between the airfoil 220 and an adjacent airfoil 221 as shown in FIG. 5 and between the hub case 222 and the shroud case 224 as shown in FIG. 3. As the airflow 230 moves over the airfoil 220, losses may occur. For example, boundary layer development may occur where the thickness of the boundary layer undesirably distorts the effective shape of the airfoil 220. In addition, flow separation from the airfoil 220 may result is distortion of the effective shape of the airfoil 220. Further, a low-pressure field may form coming off the trailing edge 228 in the form of undesirable wake. Larger wakes are a result of increased airfoil passage losses, generate greater downstream of trailing edge 228 mixing losses, and may have a detrimental dynamic impact on the downstream rotor aerodynamic and mechanical performance. As further described below, the areas where these losses would otherwise occur are identified and inlet openings 236 are provided in the airfoil 220 to reduce the losses.

As shown in FIG. 4, the airflow 231 leaving the trailing edge 228 is desirably turned from the direction of the airflow 230 approaching the leading edge 226. The airfoil 220 includes a pressure side 238 and a suction side 240. The airflow 230 directed to the pressure side 238 has a tendency to follow the surface 242 with low boundary layer thickness development, maintaining an effective area that closely matches that of the shape of the physical airfoil 220. The airflow 230 directed to the suction side 240 must be drawn along the surface 244 to reduce boundary layer thickness development, particularly approaching the trailing edge 228. The inlet opening 236 on the pressure side 238 leads to a passageway 246 through the airfoil 220 to an outlet 248 on the suction side 240. The passageway 246 directs air to the target area 250 where loss generation has been identified. The air injected back into the flow stream on the suction side 240 leaving the outlet 248 generates surface vortices 249 which draw the boundary layer down toward the surface 244 and reduce losses. The outlet 248 is positioned to maximize the loss reduction effect. The air may be injected at a single outlet 248 or at a number of outlets 248 distributed along the airfoil 220 as required. In a number of embodiments, the outlets 248 may be disposed in a targeted region of the passage 232 and may comprise numerous small openings to inject sheets of air.

Figure 6:
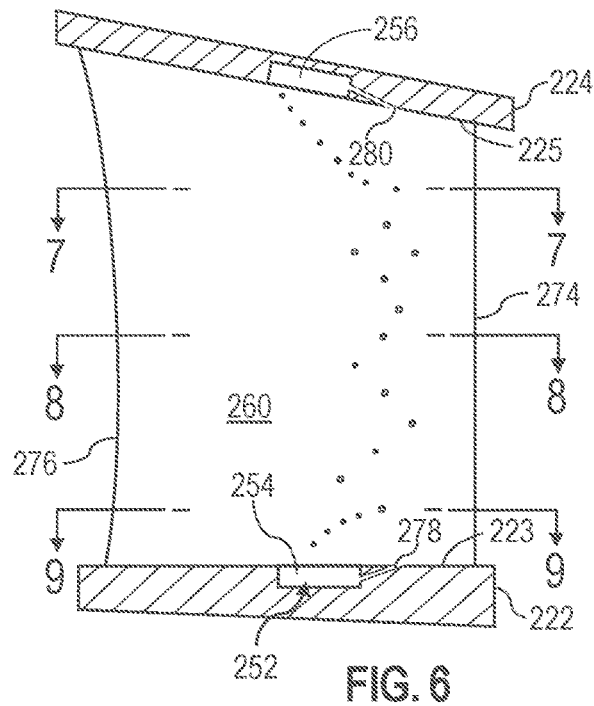
FIG. 6 is a fragmentary sectional view of a stator airfoil area of the gas turbine engine of FIG. 1 with internal cavity, according to an exemplary embodiment.
Figure 7:
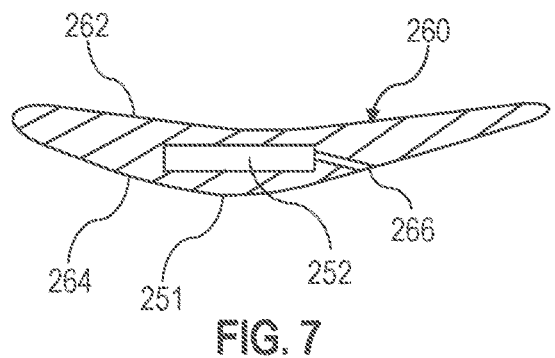
FIG. 7 is a cross sectional illustration taken generally through the line indicated at 7-7 in FIG. 6, according to an exemplary embodiment.
Figure 8:
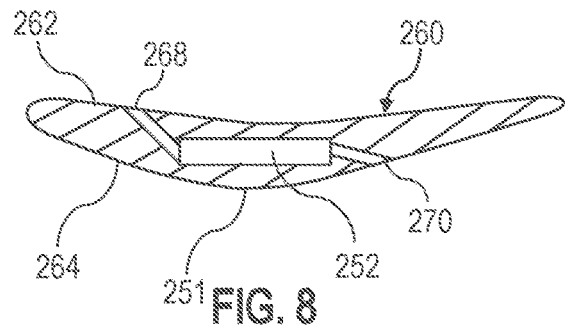
FIG. 8 is a cross sectional illustration taken generally through the line indicated at 8-8 in FIG. 6, according to an exemplary embodiment.
Figure 9:
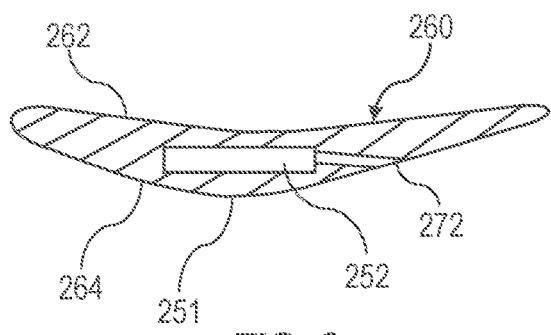
FIG. 9 is a cross sectional illustration taken generally through the line indicated at 9-9 in FIG. 6, according to an exemplary embodiment.

As illustrated in FIGS. 6-9, an airfoil 260 is similar to the airfoil 220 but includes an internal cavity 252. The internal cavity 252 is located at an internal area of the airfoil 260 that has a maximum thickness (maximum thickness area 251). This locates the cavity 252 in a position where its size may be maximized while maintaining a minimum required wall thickness of the airfoil 260. As shown in FIG. 6, in this embodiment the cavity 252 includes a segment 254 that extends into the hub case 222 and a segment 256 that extends into the shroud case 224. The passageways from the pressure side 262 to the suction side 264 pass through the cavity 252 and in this embodiment, the number of inlet openings does not match the number of outlets. The outlets target areas of the airfoil 260 to provide loss reduction and may embody any number of openings or micro-openings as needed. As shown in FIG. 7, at the illustrated section of the airfoil 260 the cavity 252 has an outlet 266 on the suction side 264 with no corresponding inlet opening on the pressure side 262. As shown in FIG. 8, at the illustrated section of the airfoil 260 the cavity 252 has an inlet opening 268 and an outlet 270. As shown in FIG. 9, at the illustrated section of the airfoil 260 the cavity 252 has an outlet 272 on the suction side 264 with no corresponding inlet opening on the pressure side 262. In this embodiment, the inlet opening 268 is positioned to collect high quality air on the pressure side 262 and deliver that air to pressurize the internal cavity 252. The outlets 266, 270 and 272 are located on the suction side 264 to inject air from the cavity 252 at specific locations selected to maximize the reduction of flow losses/deviations. The outlets 266, 270 and 272 are all positioned toward the trailing edge 274 (FIG. 6) from the maximum thickness area 251. This injects air at the locations where undesirable losses could otherwise result. The inlet opening 268 is positioned on the leading edge 276 side of the maximum thickness area 251, and radial position which ensures the collection of healthy air for supply to the cavity 252. For example, the inlet air opening(s) are positioned radially in an area of maximum pressure, or in a radial zone that has the required level of pressure for the outlet air injections. In addition, the outlet 278 is located in the hub case 222 and the outlet 280 is located in the shroud case 224 to reduce identified losses at the hub line/wall 223 and the shroud line/wall 225.

Figure 10:
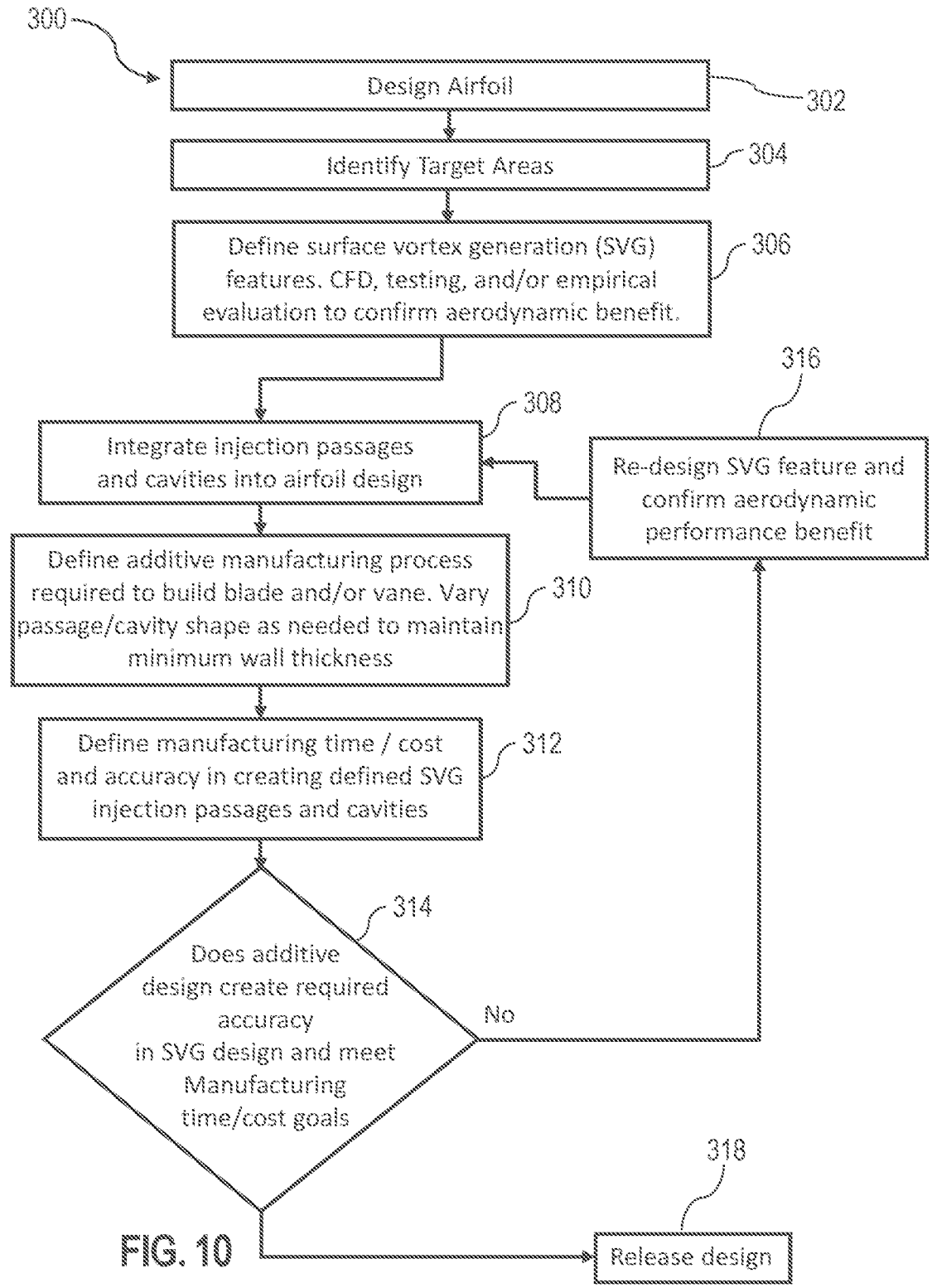
FIG. 10, is a flowchart of a process for integrating and optimizing air injection vortexes, according to an exemplary embodiment.

A process 300 for air injection passageway integration and optimization in turbomachinery is illustrated in FIG. 10 The process 300 begins with the design 302 of an airfoil, such as the airfoils 220, 260. The stator airfoil 220, 260 is designed 302 to perform its intended function considering a number of flow parameters such as mass flow rate, pressure ratio via pressure loss bucket, air velocity, flow path dimensions, turning angle for delivering flow to the downstream rotor, and others. Given the designed 302 profile of the airfoil 220, 260, air injection target areas are identified 304. For example, computational fluid dynamics (CFD) software and/or empirical evaluation may be used to identify where substantial losses arise. The identified losses may be due to causes such as boundary layer thickness, flow deviation, wake generation, or others.

With the target areas identified 304, surface micro-vortex generation features are defined 306 for minimizing the losses. For example, the magnitude of the vortices necessary to offset the losses at the target areas is evaluated such as by using CFD, testing and/or empirical evaluation. For example, SLA models may be created and tested for loss reduction. The airflow injection needed to generate the vortices is calculated. The definition 306 is conducted for all target areas 250 of the airfoil 220 and the total airflow needed for loss correction of all target areas is determined.

The process 300 continues with integrating 308 stator passageways and cavities to inject the determined airflow. Depending on the results of step 308, individual passageways such as shown in FIGS. 3-4 may be used, or a combined passageway/cavity approach such as shown in FIGS. 5-8 may be used. For the former, the airflow required at a target area 250 is used to design the passageway 246 including its inlet opening 236 and outlet 248. For the latter, the cavity 252 is designed to adequately supply all outlets 266, 270, 272, 278, 280, etc. The inlets (e.g. 268) are designed to similarly supply the cavity 252 with the adequate amount of air. Each outlet 266, 270, 272, 278, 280, etc. is designed to supply the amount and orientation of air needed for its respective target area. These target areas can distribute the flow through micro injection to further energize the boundary layer and decrease loss generation. In addition, any need is determined for passageways to inject air at the respective wall 223/225 surface of the hub case 222 and/or the shroud case 224 using a "whole channel" or "vane-to-vane passage" approach where all surfaces of the airfoil, hub and shroud that define the flow channel are addressed.

An additive manufacturing process suitable to build the airfoil is then defined 310. For example, an additive manufacturing process such as direct metal laser sintering may be used to enable a complex passageway pattern to be incorporated into the airfoil design for the necessary surface vortex generation results. Using an additive manufacturing process expands the application of integrated surface vortex generating passageways to a broad range of turbomachinery. The shapes and sizes of the passageways, including any internal cavity, are modified as required to maintain a minimum wall thickness of the airfoil as needed for the selected manufacturing process. The physical parameters of the airfoil design using the additive manufacturing process is thus defined 310.

The results of step 310 are used to define 312 the manufacturing time, cost and accuracy for the airfoil with integrated surface vortex generation injection passageways/cavities. Accuracy may refer to the ability of the integrated passageways/cavities to alleviate losses and to perform according to design requirements. In addressing losses such as flow deviation by incorporating the air injection passageways, the airfoil 220, 260 may be advantageously designed with a lower turning angle/camber than would otherwise be needed to account for losses, which adds to improved airfoil performance/efficiency.

An evaluation is conducted to determine 314 whether the airfoil design as created using the additive manufacturing process meets the defined 312 design requirements and time/cost targets. When the determination 314 has negative results, the process 300 includes redesigning 316 the passageway/cavity features and confirming the aerodynamic performance benefits achieved. The process 300 then proceeds again from step 308 onward. When the determination 314 has positive results and the design meets targets, the design is released 318 and the process 300 ends.

Figure 11:
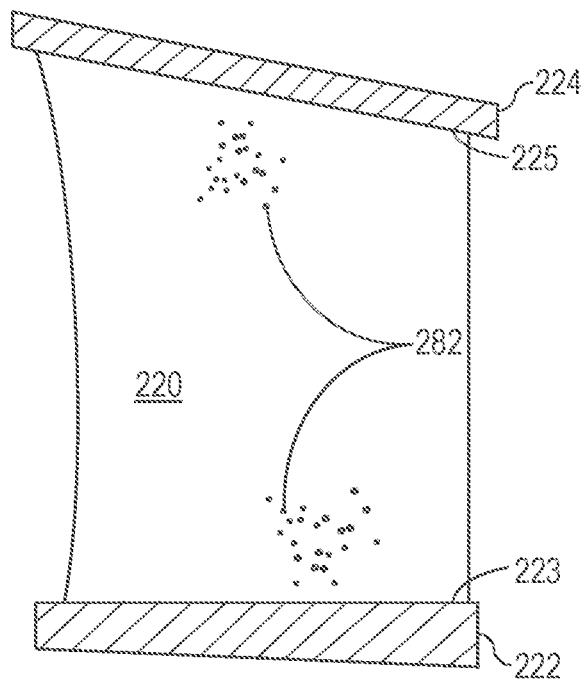
FIG. 11 is a fragmentary sectional view of a stator airfoil area of the gas turbine engine of FIG. 1 with air injection openings, according to an exemplary embodiment.
Figure 12:
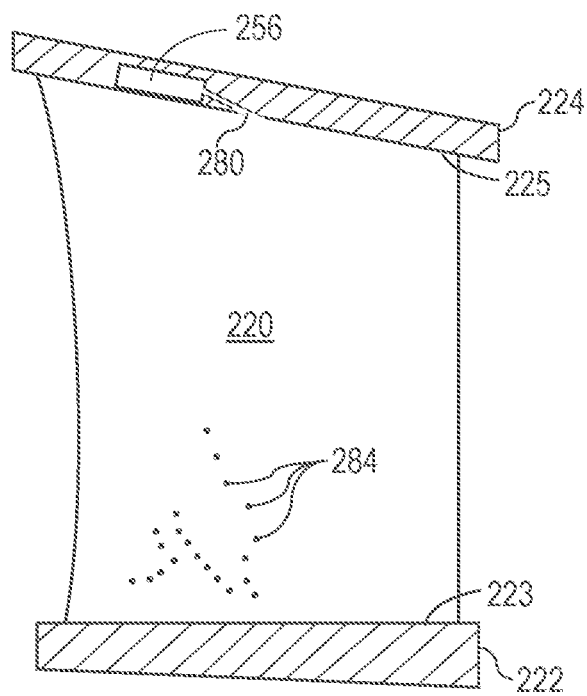
FIG. 12 is a fragmentary sectional view of a stator airfoil area of the gas turbine engine of FIG. 1 with air injection openings, according to an exemplary embodiment.
Figure 13:
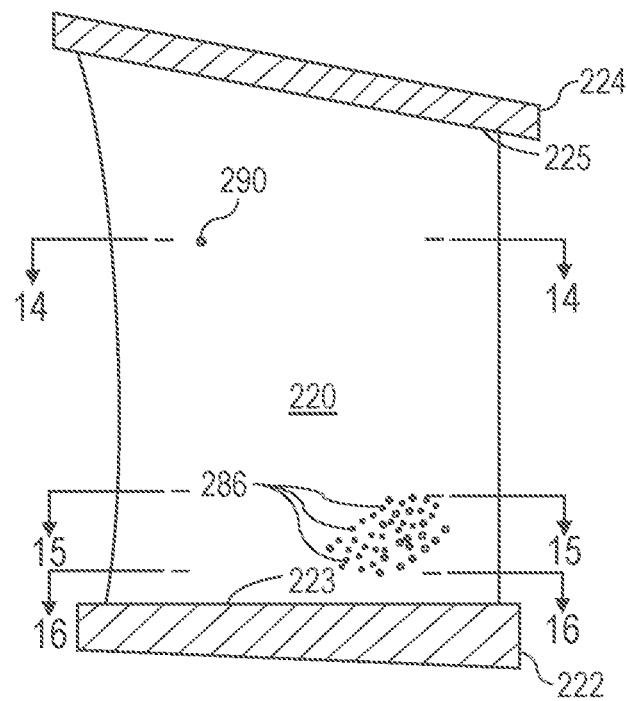
FIG. 13 is a fragmentary sectional view of a stator airfoil area of the gas turbine engine of FIG. 1 with air injection openings, according to an exemplary embodiment.

FIGS. 11-16 illustrate various outcomes of the process 300, with passageway shape, angle, size, count, spanwise extent and chordwise position determined and incorporated in the additive manufactured design. A wide range of surface micro-vortex flow generation results may be incorporated into an additive manufactured design. In the embodiment of FIG. 11, various sized outlets 282 are incorporated and are concentrated at identified target areas near the hub wall 223 and the shroud wall 225. In the embodiment of FIG. 12, common sized outlets 284 are incorporated and are concentrated at identified target areas in the radially inner half of the airfoil 220. In addition, a number of passageways with outlets 280 may be provided from the segment 256 to supply air through the shroud line/wall 225. In the embodiment of FIG. 13, an inlet 290 and various sized outlets 286 are incorporated and are concentrated near the hub case 222. The outlets 286 may be numerous and small to create micro-vortex injection zones at the target area(s). It will be appreciated that these are only example outcomes and that outlet locations will vary across the suction side of the airfoil 220, the hub wall 223 and/or the shroud wall 225.

Figure 14:
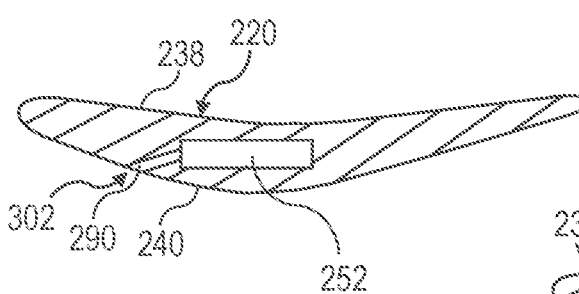
FIG. 14 is a schematic cross section of an airfoil showing suction side air extraction taken generally through the line indicated at 14-14 in FIG. 13, according to an exemplary embodiment.
Figure 15:
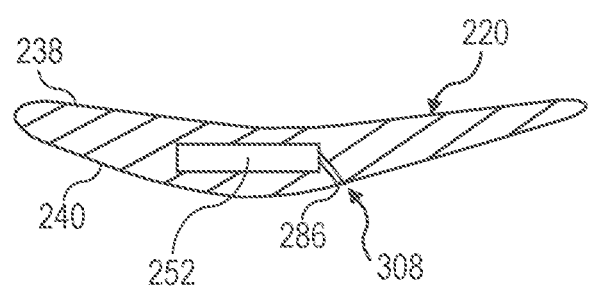
FIG. 15 is a schematic cross section of an airfoil showing suction side air injection taken generally through the line indicated at 15-15 in FIG. 13, according to an exemplary embodiment.
Figure 16:
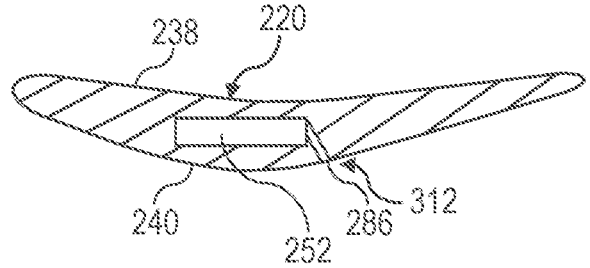
FIG. 16 is a schematic cross section of an airfoil showing suction side air injection taken generally through the line indicated at 16-16 in FIG. 13, according to an exemplary embodiment.

As illustrated in FIGS. 14-16, the process 300 may identify that aerodynamic conditions exist where air may be drawn from the suction side 240 of the airfoil 220, and where air is injected back to the common side 240 of the airfoil 220 from where the air is drawn. In FIG. 14, air is drawn from a high pressure region 302 where the inlet 290 is located, travels through the airfoil 220 via the passageway including cavity 252, and is injected in the low pressure regions where the outlets 286 are located. The airfoil 220 may include any number of inlets and outlets to supply the air needed at the identified target areas. In the example as shown in FIG. 14, the high pressure region 302 supplies air entering the airfoil 220 through the inlet 290 on the suction side 240 to the internal cavity 252. As shown in FIGS. 15-16, the air in high pressure cavity 252 is injected from the outlets 286 also on the suction side 240. In an alternate configuration where boundary layer growth on the pressure surface 238 at sections 15-15 and 16-16 needed to be controlled, air may be injected on the pressure surface 238. The supplied air may be used to address situations such as pressure side 238 separation and boundary layer development. In this case, spanwise variation in surface static pressure allows suction side extraction and suction side or pressure side air injection at other spanwise locations.

Through the embodiments described herein, air injection passageway integration and optimization is achieved in turbomachinery where airfoil suction surface micro-vortexes may be generated to reduce losses/improve performance. The airfoil may be assembled in a booster, fan, compressor, turbine or other device and may be stationary or rotating. The injected air is supplied through inlet openings at a high pressure zone through passageways/cavities to the outlets at a weak boundary layer zone, which are specifically located at target areas to optimize airfoil performance. Targeted areas may include those where boundary layer development would otherwise lead to associated secondary flow losses. Healthy air is taken from either airfoil side and redirected through the airfoil/hub/shroud for improvement at the targeted areas using a "whole channel" approach where all surfaces of the airfoil, hub and shroud that define the flow channel are addressed. The airfoil's turning ability may be improved and wakes off the trailing edge may be minimized with reduced trailing edge deviation. While the embodiments described herein may be directed to stationary stator airfoils, the principles equally apply to other types of airfoils, blades, vanes, etc. Injected air generated micro-vortexes result in improvements to boundary layer thickness, reduced deviation, reduced wake depths and optimized turning efficiency.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A turbomachine system comprising:
   an airfoil including a leading edge, a trailing edge, a pressure side, and a suction side, wherein:
      the airfoil is configured to influence an airflow as it passes through channels adjacent the airfoil from the leading edge to the trailing edge, the airfoil extending from a hub to a shroud,
      the airfoil defines a number of aerodynamic passageways having at least one inlet and a plural number of outlets,
      the number of aerodynamic passageways are configured to deliver air from the airflow through the airfoil to a target area,
      the outlets are dispersed in the target area on the airfoil and are concentrated together in groups located in the target area resulting in an irregular pattern of the outlets on the airfoil, wherein the target area is targeted due to a propensity to generate undesirable flow losses, and
      the outlets are located on the airfoil only adjacent the hub and adjacent the shroud, meaning none of the outlets are disposed at a middle of the airfoil between the hub and the shroud, with the outlets clustered in a first area that is closer to the hub than to the middle of the airfoil and in a second area that is closer to the shroud than to the middle of the airfoil.

2. The system of claim 1, wherein the airfoil includes a maximum thickness area between the leading edge and the trailing edge where the airfoil is most thick, wherein the outlets are all located between the maximum thickness area and the trailing edge and the at least one inlet is located between the leading edge and the maximum thickness area.

3. The system of claim 1, wherein the airfoil is disposed between the shroud and the hub, wherein at least one of the hub and the shroud includes a part of the number of aerodynamic passageways and at least some of the outlets.

4. The system of claim 3, wherein the number of aerodynamic passageways include a cavity that has a segment in each of the airfoil, the hub and the shroud, wherein the cavity extends through the hub, the shroud and through the airfoil from the hub to the shroud.

5. The system of claim 1, wherein the number of aerodynamic passageways couple the at least one inlet with the outlets through an internal cavity in the airfoil.

6. The system of claim 1, comprising a first plural number of inlets, including the inlet, and a second plural number of outlets, including the outlets, wherein the first plural number is different than the second plural number.

7. The system of claim 1, wherein the airfoil comprises at least one of a stator and a rotor in at least one of a fan, a booster and a compressor.

8. The system of claim 1, wherein the airfoil comprises an additive manufactured structure.

9. The system of claim 1, wherein the outlets are configured to generate surface vortices on the suction side, wherein the channels include a first channel on the pressure side and a second channel on the suction side, wherein the number of aerodynamic passageways conduct a part of the airflow from the first channel, through the airfoil, and into the second channel, wherein the outlets comprise multiple openings concentrated together to inject sheets of air on the suction side.

10. A method of manufacturing a turbomachine comprising:
   forming an airfoil to include a leading edge, a trailing edge, a pressure side, and a suction side so that the airfoil is configured to influence an airflow as it passes through channels adjacent the airfoil from the leading edge to the trailing edge, with the airfoil extending from a hub to a shroud;
   defining a number of aerodynamic passageways having at least one inlet on the pressure side, and having a plural number of outlets on at least one of the pressure side and the suction side;
   configuring the number of aerodynamic passageways to deliver air from the airflow through the airfoil between the pressure side and the suction side;
   identifying areas of a passage defined between adjacent airfoils and opposing walls that have a propensity to generate undesirable flow losses;
   targeting the outlets to inject the air at the areas including dispersing the outlets in the target area on the airfoil in concentrated together groups located in the target area resulting in an irregular pattern of the outlets on the airfoil; and locating the outlets on the airfoil only adjacent the hub and adjacent the shroud, meaning none of the outlets are disposed at a middle of the airfoil between the hub and the shroud, with the outlets clustered in a first area that is closer to the hub than to the middle of the airfoil and in a second area that is closer to the shroud than to the middle of the airfoil.

11. The method of claim 10, comprising:
identifying a maximum thickness area of the airfoil between the leading edge and the trailing edge where the airfoil is most thick; and
locating the outlets all between the maximum thickness area and the trailing edge; and
locating the at least one inlet between the leading edge and the maximum thickness area.

12. The method of claim 10, comprising:
connecting the airfoil between the shroud and the hub defining a part of the number of aerodynamic passageways and at least some of the outlets through at least one of the hub and the shroud.

13. The method of claim 12, comprising defining, as part of the number of aerodynamic passageways, a cavity that has a segment in each of the airfoil, the hub and the shroud, and extending the cavity through the hub, the shroud and through the airfoil from the hub to the shroud.

14. The method of claim 10, comprising:
coupling, by the number of aerodynamic passageways, the at least one inlet with the outlets; and
defining an internal cavity in the airfoil as a part of the number of aerodynamic passageways.

15. The method of claim 10, comprising forming plural inlets and plural outlets in the airfoil, wherein there is a different number of the plural outlets than of the plural inlets.

16. The method of claim 10, comprising modifying a shape and a size of the number of aerodynamic passageways to maintain a minimum wall thickness of the airfoil.

17. The method of claim 10, comprising building up the airfoil by an additive manufacturing process; and forming the number of aerodynamic passageways simultaneously during the building up.

18. The method of claim 10, comprising generating, by the outlets, surface vortices on the suction side of the airfoil; defining the channels to include a first channel on the pressure side and a second channel on the suction side; constructing the number of aerodynamic passageways to conduct a part of the airflow from the first channel, through the airfoil, and into the second channel; and defining the outlets as multiple openings concentrated together to inject sheets of air on the suction side.

19. The method of claim 10, comprising:
determining design requirements for performance of the airfoil;
determining whether the airfoil meets the design requirements; and
when the airfoil does not meet the design requirements, redesigning the number of aerodynamic passageways.

20. A turbomachine system comprising:
a shroud and a hub configured to contain an airflow;
a plurality of airfoils disposed between the shroud and the hub, each airfoil including a leading edge, a trailing edge, a pressure side, and a suction side,
wherein:
the shroud, the hub, and the airfoils define a number of airflow channels in the turbomachine;
each airfoil is configured to influence the airflow as it passes through one of the airflow channels from the leading edge to the trailing edge,
the airfoil defines a number of internal aerodynamic passageways, each of the internal aerodynamic passageways having an inlet, a cavity, and an outlet,
the internal aerodynamic passageways are configured to deliver air from the airflow through the airfoil to the outlets, and
the outlets are configured to inject the air at areas of the airflow channels targeted due to their propensity to generate undesirable flow losses in the airflow channels with the outlets dispersed in the target area on the airfoil in concentrated together groups located in the target area resulting in an irregular pattern of the outlets on the airfoil, where the irregular pattern results in the outlets being located closer to the trailing edge than to the leading edge and the outlets are not evenly spaced on the airfoil between the hub and the shroud,
wherein the outlets are located on the airfoil only adjacent the hub and adjacent the shroud, meaning none of the outlets are disposed at a middle of the airfoil between the hub and the shroud, with the outlets clustered in a first area that is closer to the hub than to the middle of the airfoil and in a second area that is closer to the shroud than to the middle of the airfoil,
wherein the outlets vary in size,
wherein the outlets are irregularly spaced from one another in spanwise and chordwise positions.

* * * * *

UNITED STATES PATENT AND TRADEMARK OFFICE
CERTIFICATE OF CORRECTION

PATENT NO. : 11,608,744 B2
APPLICATION NO. : 16/927161
DATED : March 21, 2023
INVENTOR(S) : Jeffrey Gluck, Bruce Reynolds and John Repp It is certified that error appears in the above-identified patent and that said Letters Patent is hereby corrected as shown below:

In the Claims

Column 12, Line 18 (Claim 20), after "through", delete "one of"

Signed and Sealed this
Sixteenth Day of April, 2024

Katherine Kelly Vidal
*Director of the United States Patent and Trademark Office*